United States Patent

[11] 3,632,177

| | | |
|---|---|---|
| [72] | Inventor | Mervyn Brian Packer<br>Leamington Spa, England |
| [21] | Appl. No. | 791,231 |
| [22] | Filed | Jan. 15, 1969 |
| [45] | Patented | Jan. 4, 1972 |
| [73] | Assignee | Automotive Products Company Limited<br>Leamington Spa, England |
| [32] | Priority | Jan. 15, 1968 |
| [33] | | Great Britain |
| [31] | | 2,077/68 |

[54] MEANS FOR PREVENTING SKIDDING OF VEHICLE WHEELS
1 Claim, 11 Drawing Figs.

[52] U.S. Cl. .................................................. 303/21 A,
188/181 C, 303/22 R
[51] Int. Cl. ........................................................ B60t 8/14,
B60t 8/22
[50] Field of Search ............................................ 303/21, 22,
6, 6 C, 24; 188/181

[56] References Cited
UNITED STATES PATENTS

| 2,181,161 | 11/1939 | Wolf | 303/21 UX |
| 3,301,608 | 1/1967 | Harned et al. | 303/21 |
| 3,362,757 | 1/1968 | Marcheron | 303/21 |
| 3,433,536 | 3/1969 | Skinner | 303/21 |
| 3,467,444 | 9/1969 | Leiber | 303/21 |
| 3,479,094 | 11/1969 | Chovings | 303/21 |

*Primary Examiner*—Milton Buchler
*Assistant Examiner*—John J. McLaughlin
*Attorney*—Lawrence J. Winter ABSTRACT: Vehicle braking control apparatus including first, second and third transducers responsive to vehicle deceleration, axle load or displacement and antilock controlled brake pressure respectively to produce electrical signals $V_D$, $V_A$ and $V_P$ indicative thereof, a comparator device responsive to the electrical signals to produce an output signal therefrom whenever the signals at the input of the comparator bear the following relationship:

$$I_P - I_B + I_A S\ I_D$$

where currents $I_P$, $I_A$ and $I_D$ are proportional to voltages $V_P$, $V_A$ and $V_D$ respectively and $I_B$ is the current proportional to a fixed bias voltage $V_B$, and antilock modulating solenoid operated valve means being arranged to be actuated in response to the presence of an electrical signal at the output of the comparator device.

MEANS FOR PREVENTING SKIDDING OF VEHICLE WHEELS

This invention relates to means, referred to as antilock means, for incorporation in a fluid pressure operated braking system of a vehicle, said means being operable to reduce automatically the fluid pressure exerted to apply the brake or brakes of the vehicle as a result of a tendency of the said wheel or wheels to skid or to approach conditions in which skidding would commence, so that the braking can be relieved to prevent continued wheel locking and resulting sliding of the vehicle, and to restore the fluid pressure when the tendency to skid has been eliminated or reduced.

It has been proposed, in antilock systems associated with fluid pressure braking systems in which air pressure is employed to apply the brakes or the normal application of the brakes depends on the operation of a servomotor by air pressure, to control the degree of release of the brakes by controlling the release of pressure from the air pressure system through a relief valve the load opposing the opening of which varies with the rate of vehicle deceleration and the load on the vehicle wheels, so that the relief of pressure depends on the relation between a resultant force due to the said rate of deceleration and vehicle load, and the pressure in the air pressure system. There may also be provided means exerting a constant load opposing the opening of the relief valve. Such a system is described in out copending U.S. application, Ser. No. 704,310.

The rate of vehicle deceleration was sensed by a pendulum acting on the relief valve through a spring which was preloaded to provide the constant closing load and a mechanical linkage coupled between sprung and unsprung parts of the vehicle so as to be moved by deflection of the vehicle suspension was coupled to another spring acting in opposition to the first spring so as to reduce the resultant closing force on the valve as the vehicle load decreased.

It is an object of the present invention to provide means enabling the relief valve to be controlled in a similar manner without the necessity for mechanical connections between the sensing devices and the relief valve.

According to the present invention there is provided vehicle braking control apparatus including antilock modulating solenoid-operated valve means arranged to be actuated in response to electrical signals produced from the output of electronic comparator means responsive directly to a signal indicative of rate of change of wheel rotation speed or to a combination of parameters which govern said rate of change of wheel rotation speed.

In one embodiment of the invention as electronic summer/comparator and amplifier unit is arranged to have applied thereto a voltage $V_A$ produced by a first transducer responding to axle load or displacement, a voltage $V_D$ produced by a second transducer responding to vehicle deceleration, and a voltage $V_P$ produced by a third transducer responding to brake system pressure or to servo device control pressure, i.e., antilock-controlled brake pressure, the voltage $V_D$ produced by the second transducer being of opposite sense from the voltages $V_A$, $V_B$, produced by the first and third transducers and the valve being operated to prevent further release of braking pressure when the currents at the input of the comparator and proportional to the said voltages, bear the following relationship:

$$I_P - I_B + I_A < I_D$$

where currents $I_P$, $I_A$ and $I_D$ are proportional to voltages $V_P$, $V_A$ and $I_D$ respectively and $I_B$ is the current proportional to a fixed bias voltage $V_B$. The constant voltage is applied to the summer/comparator and amplifier to provide the effect of a constant load on the valve. This embodiment of the invention is particularly but not exclusively suitable for use in a braking system in which wheel deceleration is sensed by an inertia-responsive sensor.

In an alternative brake pressure modulation method utilizing electrical signals produced by electronic means to control brake release and reapplication, wheel deceleration or acceleration may be sensed at one of three different points:

a. wheel deceleration at a point immediately prior to cessation of rotation of the wheel, i.e., where the wheel reaches a low value of deceleration after high deceleration;
b. wheel deceleration at cessation of rotation of the wheel; or
c. wheel acceleration at a point immediately after the wheels start to reaccelerate, and voltage signals proportional to the wheel deceleration or acceleration are produced and applied to comparator means for the control of a brake pressure release valve. If the brake pressure release is arrested when wheel deceleration into a skid has ceased (point (b)) or has fallen to a predetermined low value (point (a)), a difficulty arises if the wheel locks and thus arrests brake pressure release, before the brake pressure has been reduced sufficiently to permit reacceleration. Accordingly, it is preferred to sense wheel acceleration (point (c)) i.e., to delay the arrest of brake release until the wheel starts to reaccelerate. Alternatively, brake release is arrested when the wheel speed exceeds that at which wheel deceleration ceased by a predetermined value, e.g., 5 m.p.h.

The various embodiments of the present invention will now be described by way of example only with particular reference to the accompanying drawings wherein.

Figure 1:
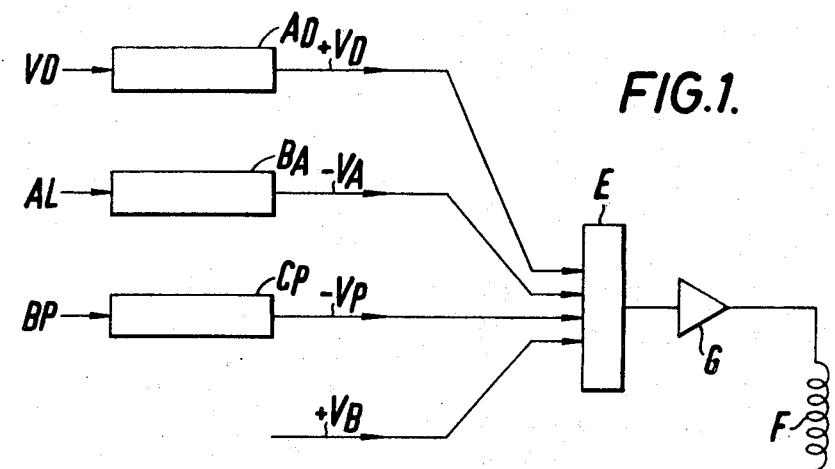
FIG. 1 is a block schematic diagram of one embodiment of the invention in which voltages indicative of vehicle deceleration, axle load and antilock-controlled brake pressure are compared to produce a control signal for brake pressure modulation.

In the embodiment of the invention illustrated with reference to FIGS. 1 to 3d, electronically derived control signals are used to limit the value to which pressure is allowed to fall in accordance with prevailing conditions of road surface and axle load and these signals provide a signal for the control of an antilock modulating solenoid-operated valve. Referring to FIG. 1 a transducer $A_D$ is arranged to provide a +ve output voltage $V_D$ which is a function of vehicle deceleration VD. A second transducer $B_A$ is arranged to produce a −ve output voltage $V_A$ which is a function of axle load or displacement AL and a third transducer $C_P$ is arranged to produce a −ve output voltage $V_P$ which is a function of antilock-controlled brake pressure B.P. Signals proportional to the voltage signals are applied to a comparator device E in conjunction with a constant bias +ve voltage $V_B$ representing the spring load required to bias the antilock modulating solenoid valve F to the closed state. As shown in FIG. 1 a valve-drive amplifier G may be used if necessary to amplify the output signal from the comparator E in order to effect energization or deenergization of the coil $R_A$ of a valve B (FIG. 2).

Figure 2:
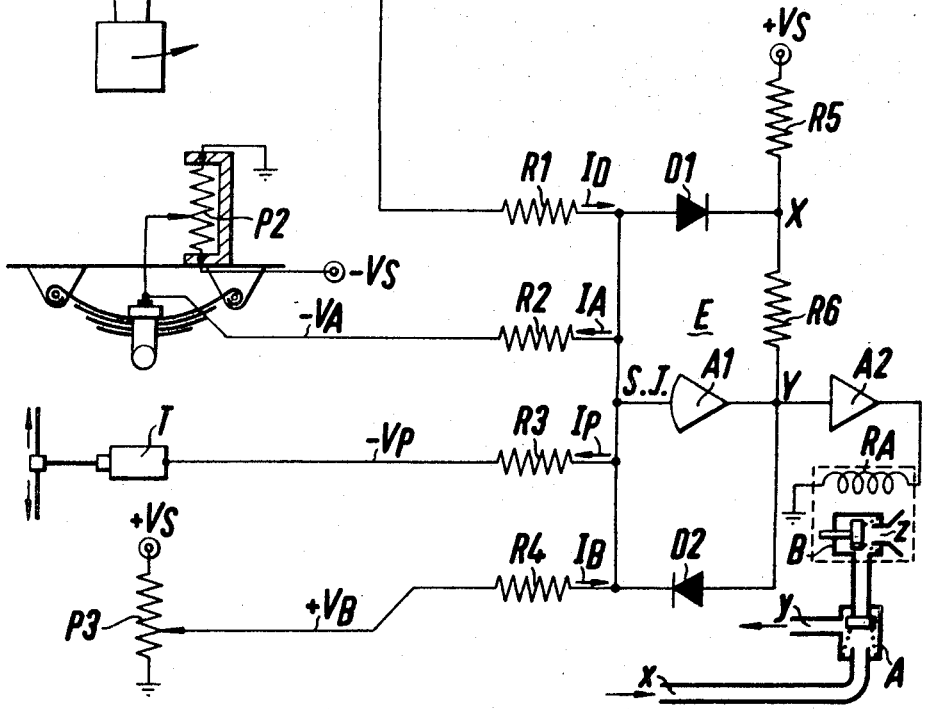
FIG. 2 is a more detailed circuit diagram partly in block form of the embodiment of FIG. 1.

A more detailed circuit diagram of the above embodiment is illustrated in FIG. 2. A potentiometer $P_1$ is connected between a point of constant voltage $+V_S$ and earth and the potentiometer takeoff or slider is operated by a pendulum P mounted to swing in a fore-and-aft plane of the vehicle so as to be deflected by deceleration forces to provide a voltage signal $+V_D$ which varies in magnitude with deceleration of the vehicle. The voltage is applied via a resistor R1 to one input of the comparator device E and the current proportional to voltage $V_D$ is indicated as $I_D$. The potentiometer P2 is connected between a source of negative voltage $-V_S$ and earth and the slider thereof connected to the vehicle such as to provide a $-ve$ voltage $V_A$ related to axle displacement or load. The voltage $V_A$ is applied via resistor R2 to another input of comparator E to provide a current $I_A$ proportional to voltage $V_A$. A transducer T responsive to brake fluid pressure and connected to brake control means is arranged to produce an output voltage $-V_P$ related to antilock controlled brake pressure and is applied via resistor R3 to another input of the comparator to provide current $I_P$ proportional to voltage $V_P$. A positive bias voltage $+V_B$ is derived from the slider of potentiometer P3 connected between $-ve$ voltage source $V_S$ and earth and is applied via resistor R4 to provide current $I_B$. The currents $I_D$, $I_A$, $I_P$ and $I_B$ flow into or out of the summing junction S.J. of an operational amplifier A1 of the comparator device E, as shown by the arrows in FIG. 2. The operational amplifier A1 has a high gain and a high input impedance and low output impedance, and as with any operational amplifier, any input signal is amplified and inverted. A voltage $+V_S$ is applied via voltage divider R5/R6 to the output of the amplifier A1 and oppositely poled diodes D1, D2, are connected across the amplifier as shown. A valve drive amplifier A2 is connected between the output of amplifier A1 and the coil $R_A$ of an antilock modulating solenoid-operated valve B, but the amplifier A2 may be dispensed with if the signals from the output of amplifier A1 are sufficient to effect energization of coil $R_A$.

Where the antilock brake pressure is above a predetermined limiting value, the following relationship exists between the currents at the summing point S.J. of the comparator E:

$I_P - I_B + I_A > I_D$

The nett current flows away from point S.J. and since the current can only come via diode D2 in view of the high input impedance of amplifier A1, the voltage output from the amplifier output Y will be held at the virtual earth potential of point S.J. Thus, whilst the nett input voltage is $-ve$ i.e., the braking pressure is above the required limiting value as set by the values of $V_D$, $V_A$ and $V_B$, the output of the operational amplifier A1 remains at earth potential and the coil RA of solenoid-operated valve B remains deenergized and the valve remains in the state shown in FIG. 2.

Where the brake pressure is slightly below the required limiting value the current relationship is as follows:

$I_P - I_B + I_A < I_D$ and thus the nett current flows towards point S.J. and the nett input voltage is $+ve$. The voltage at point Y thus immediately tends to go highly $-ve$ and point X on the voltage divider R1/R2 tends to go $-ve$. However, the potential difference across R6 tends to increase thus opposing the tendency for point X to go $-ve$ and the voltage at X will tend towards zero. The output voltage at point Y is limited to a $-ve$ value such as to retain a zero voltage at point X and this limited output voltage is arranged such as to energize coil $R_A$ to effect operation of valve B and arrest brake release.

Under normal braking conditions, the coil RA of valve B may be energized or not depending on prevailing conditions but with valve A, which is an antilock control valve in the position shown, the state of valve B under such conditions is irrelevant. For valve B the point z may be exhausted to atmosphere or alternatively may be an inlet for supply pressure according to the particular application. Valve A may be operated mechanically, e.g., by means of a mechanical antilock sensor or electrically, e.g., by means of a solenoid driven by a signal derived from an electronic deceleration sensing circuit. Valve A is supplied with brake application pressure or supply pressure according to the application, via inlet x and outlet y is connected to the brake cylinder or antilock regulating means e.g., antilock servo according to the application.

Figure 3A:
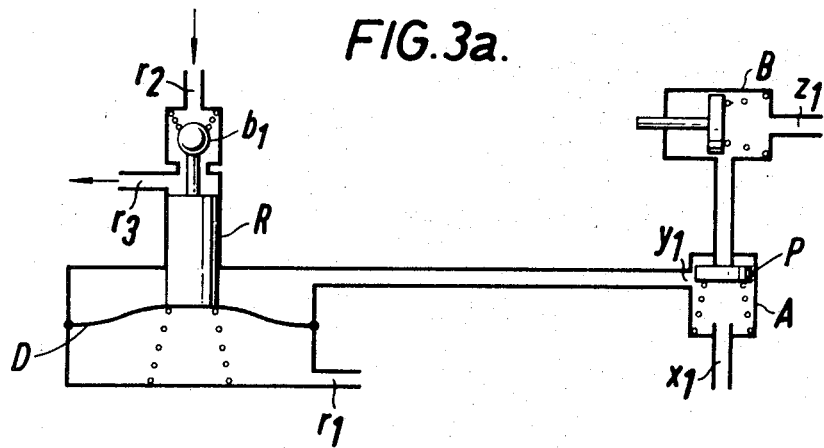
FIGS. 3a to 3d illustrate how the signals produced from the circuit of FIG. 2 are used to control the valves of various braking systems.

The applications referred to above are illustrated in FIGS. 3a to 3d of the drawings. In FIG. 3a the modulating solenoid-operated valve B has a constant atmospheric pressure supply via inlet $Z_1$. The antilock control valve A is a plate valve and has an inlet $X_1$ which is supplied continuously with a vacuum. The outlet $y_1$ of valve A is coupled to one inlet of an hydraulic-type antilock servo R with spring and/or control fluid reacting hydraulic pressure, having antilock control on the top or smaller initial volume chamber of the servo. As shown, a constant vacuum is supplied via inlet $r_1$ of servo R and inlet $r_2$ receives hydraulic fluid from a master cylinder. The outlet $r_3$ supplied hydraulic fluid to the brakes of the vehicle.

In operation when the wheel goes into a skid the plate P of valve A moves to seal inlet $x_1$ and atmospheric pressure is supplied along $y_1$. This establishes a differential pressure across the diaphragm D and causes the ball valve $b_1$ to seal thus closing the inlet $r_2$. The plunger R continues to move down increasing the volume of the brake line $r_3$ and so reducing the pressure applied to the brakes. The wheels stop decelerating and the valve B closes inlet $Z_1$ establishing the differential pressure across the diaphragm D. The wheels then accelerate up to vehicle speed and valve A returns to the position shown creating a vacuum on either side of the diaphragm and enabling the brake pressure to be applied again.

Figure 3B:
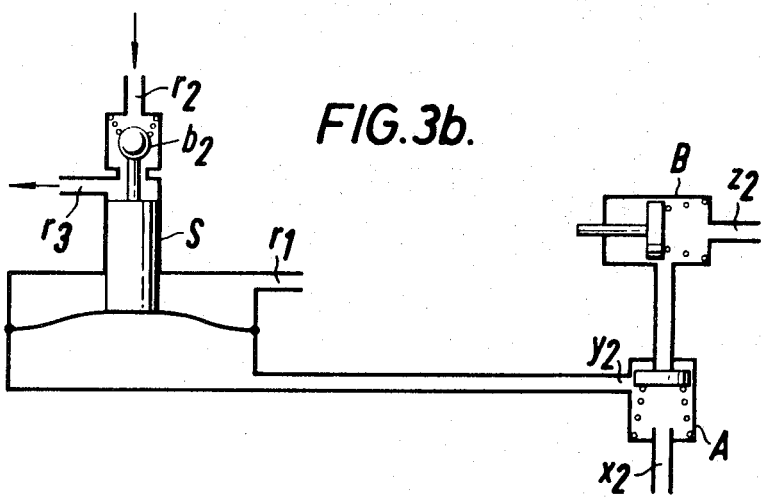

In FIG. 3b, inlet $Z_2$ of valve B is connected to a constant vacuum supply while atmospheric pressure is supplied to inlet $x_2$ of valve A. Outlet $y_2$ of plate valve A is coupled to an hydraulic type servo S with antilock control on the bottom (larger initial volume) chamber of the servo. The supplies to inlets $r_1$, $r_2$, and $r_3$ are the same as for FIG. 3a. In operation when the wheel goes into a skid the valve A seats to cut off the atmospheric pressure from $y_2$. The hydraulic pressure forces plunger S down and $b_2$ seats. S continues to move down increasing the volume along $r_3$ and consequently reducing the brake pressure. The wheel stop decelerating and the valve B closes inlet Z. As the wheels accelerate up to vehicle speed valve A returns to the position shown allowing atmospheric pressure along $y_2$ to open the ball valve $b_2$.

Figure 3C:
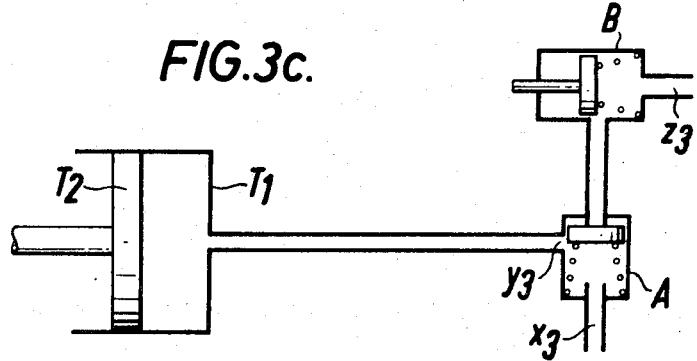

In FIG. 3c, $Z_3$ is an exhaust port to the atmosphere and valve A receives pressure from a brake control valve at $x_3$. Outlet $y_3$ is coupled direct to brake cylinder $T_1$ for the control of brake actuation piston $T_2$. When the wheels go into skid valve A seats to prevent brake pressure being applied to $T_2$ and $y_3$ is exhausted to the atmosphere. The wheels stop decelerating and valve B closes to prevent further exhaustion of brake pressure. Valve A returns to the position shown and brake pressure is applied again.

Figure 3D:
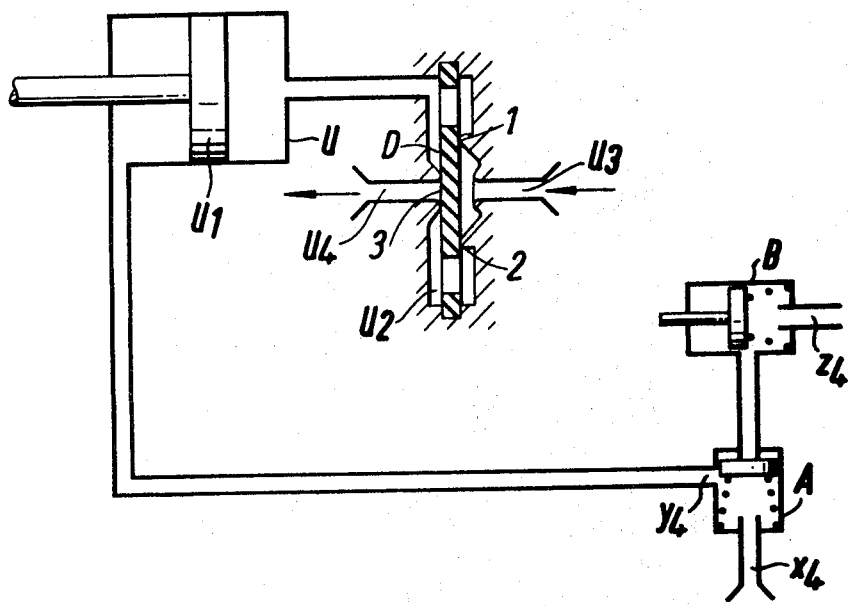

In FIG. 3d the control exerted by the actuation of valve B is applied to oppose brake application force and inlet $Z_4$ of valve B is supplied with air/fluid pressure to oppose the applied force on the brake. Port $x_4$ of valve A is exhausted to atmosphere and outlet $y_4$ of valve A is coupled to brake cylinder U having a piston $U_1$ located therewithin and controlled by a quick-release-type valve $U_2$ receiving air pressure from the brake control valve operated by the brake pedal, via inlet port $U_3$ and exhausted via port $U_4$. The pressure from $U_3$ is applied via quick-release valve $U_2$ containing a diaphragm D. When pressure is applied along $U_3$ fluid forces the diaphragm to distort at 1 and 2 allowing the pressure to be applied to $U_1$. When the wheels go into a skid the valve A seats to close $x_4$, pressure is applied from Z $_4$, to $U_1$ to release the braking pressure. As $U_1$ is forced back by pressure from $Z_4$ the diaphragm distorts at 3 to allow fluid to pass through exhaust $U_4$. The wheels stop decelerating, valve B closes and valve A returns to the position shown allowing the brake pressure to be applied again.

If required, valves A and B may be two valves connected in series as described in the above applications or alternatively valves A and B may be combined into one valve operable in two modes.

In a further embodiment of the invention illustrated in FIGS. 4 to 7a and 7b of the drawings, an alternative form of electronically controlled brake-pressure modulation is provided for use with any form of antilock giving brake release control and brake reapplication signals. Referring to the graph shown in FIG. 4, this embodiment of the invention provides means for sensing wheel speed at a time a. where wheel stops decelerating into a skid; or
b. where wheels start to reaccelerate; or
c. where wheel deceleration into a skid falls to a predetermined low value and
d. where wheel reacceleration exceeds a predetermined low value.

Figure 5:
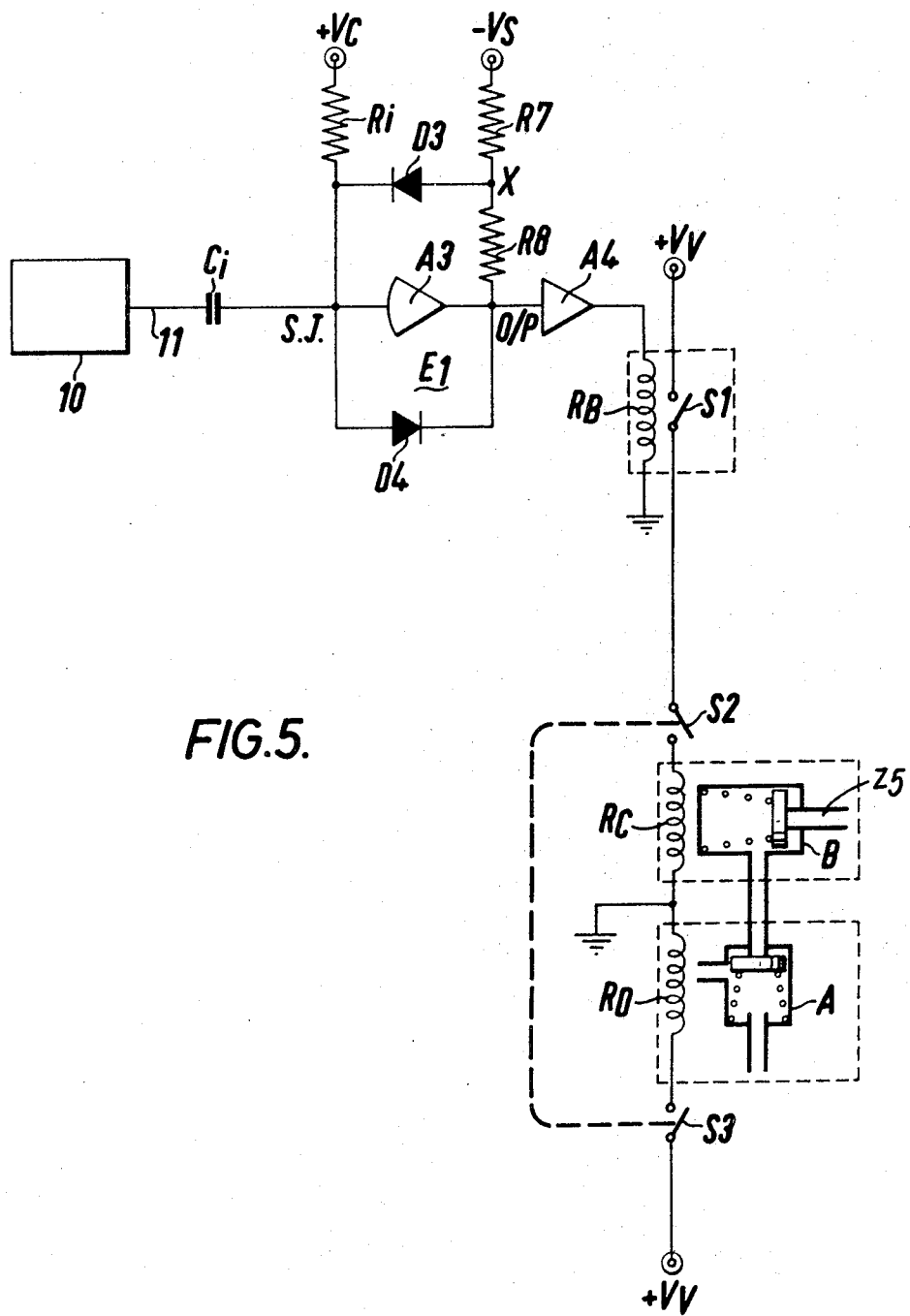
FIG. 5 is a circuit diagram, partly schematic illustrating the manner in which the generation of a signal at the output of the amplifier is dependent on the resultant input signal.

The circuit of FIG. 5 enables brake release and reapplication signals to be generated for one of conditions a, b and c above. FIG. 5 shows a sensing device 10 such as a tachogenerator on a wheel of the vehicle and arranged to produce a voltage signal on line 11 proportional to wheel speed. This voltage signal is differentiated by a differentiator circuit comprising capacitor Ci and resistor Ri connected between a summing junction S.J. of comparator $E_1$ and a source of voltage $V_C$. The comparator $E_1$ is similar to that described in connection with the embodiment of FIG. 2 and includes an operational amplifier A3 having a diode D3 connected between the differentiator circuit and the junction X of voltage divider R7, R8; resistor R7 being connected to a negative voltage source $-V_S$. A further diode D4 is connected between the input and output terminals of amplifier A3 and a valve driver amplifier A is provided, if required to produce amplified reinverted signals for the energization of coil $R_B$ when the appropriate conditions cause an output signal to be generated from the comparator. Coil $R_B$ has associated therewith a normally open switch contact S1 connected in series with further switch contacts S2, S3 controlled by an antilock system giving brake release and reapplication signals as will be hereinafter described. A relay coil $R_C$ is connected between normally open switch S2 and earth and controls the operation of valve B whilst a further relay coil $R_D$ is connected in circuit with normally open switch contact S3 and earthed as shown and controls the operation of valve A. Briefly, the output at the output of amplifier A3 depends on the resultant signal at the input. The point on the wheel deceleration curve sensed depends on the value of the voltage $V_C$ and the sign thereof and the output produced depends upon whether the wheel is accelerating or decelerating. The output is zero a. when the value of $V_C$ is zero and the wheel is not decelerating; or
b. when $V_C$ is $-$ve and the wheel is accelerating; or
c. when $V_C$ is $+$ve and the wheel is decelerating.

Firstly, considering the condition where the wheel stops decelerating into a skid, the value of $V_C$ is made zero or earth potential. When the wheel is accelerating, current flows towards point S.J. of amplifier A3 from capacitor Ci and this current flows through diode D4 to hold point O/P of the amplifier at earth potential, i.e., the potential of point S.J. No output signal is produced at the output of the comparator E1 and consequently there is no energization of coil $R_B$ and switch contact S1 remains open. During wheel deceleration, current flows in the opposite direction, i.e., from point S.J. towards capacitor Ci and this is equivalent to the right-hand plate of capacitor Ci having a $-$ve charge. Point O/P tends towards a $+$ve potential but is limited by the positive potential of voltage divider point X. Current flows through D3 causing a voltage drop across resistor R8 until such time as point X returns to earth potential. Thus, the output point O/P of amplifier A3 is held at a certain limited potential while the wheel decelerates and this signal is amplified in amplifier A4 to effect energization of relay $R_B$ and close associated contact S1. Switch contact S1 will reopen when point O/P returns to zero potential, i.e., when wheel stops decelerating.

Secondly, considering the condition when wheel acceleration exceeds a predetermined low value, voltage $V_C$ is made negative and when the wheel is decelerating, the position is as indicated above for wheel deceleration with the exception that because of the negative voltage $-V_C$, current flows from point S.J. into resistor Ri. As previously indicated contact S1 is held closed while the wheel is decelerating. With wheel acceleration, the position is the same as previously indicated for wheel acceleration, i.e., current flows towards point S.J. except that now the current also flows from S.J. into resistor Ri. Thus only when the acceleration is such that the current at Ci exceeds the current through Ri i.e., the nett current flow into S.J. will diode D4 conduct. Output point O/P will be at zero potential and relay $R_B$ will be deenergized to open contact S1.

Thirdly, considering the case where wheel deceleration into a skid falls to a set low value, voltage $V_C$ is made positive and for wheel acceleration, the position is the same as for the first case for wheel acceleration but in addition a current flows towards point S.J. from resistor Ri. The currents pass through diode D4 to the point O/P of amplifier A3 holding this point at zero or earth potential. No energization of relay $R_B$ occurs and switch contact S1 remains open, while the wheel is accelerating. With wheel deceleration, the position is again as described in the first case, i.e., current flows from point S.J. into capacitor Ci, but current also flows towards S.J. from resistor Ri. Thus, when wheel deceleration is such that current at Ci exceeds the current through Ri, a nett current flows from S.J. and is equivalent to a nett negative input voltage at the input of amplifier A3. Point O/P tends towards a positive potential but when point X of the voltage divider reaches zero volts, the output at point O/P is limited to a positive voltage. This signal is amplified in drive amplifier A4 to effect energization of relay $R_B$ open switch contact S1 until the acceleration falls to the low value set by voltage $V_C$. In explanation of the graph of FIG. 4, the dotted line extending between the points 1 and 3 of the $W_S$ curve, together with those parts of the $W_S$ curve at the left and right of points 1 and 3 "and at line 20, following the comma, insert the words" the curve $V_S$ represents the vehicle speed in the absence of skid conditions indicates vehicle speed, the full line curve indicates wheel speed $W_S$ and the dotted line curve $B_P$ indicates brake pressure. Point 1 on the vehicle speed curve indicates the point at which a signal for the release of brake pressure is initiated by the associated antilock means and the pressure release is arrested at a point 2 within region T1. A brake reapplication signal is generated by the associated antilock means at point 3 of the vehicle speed curve.

Figure 4:
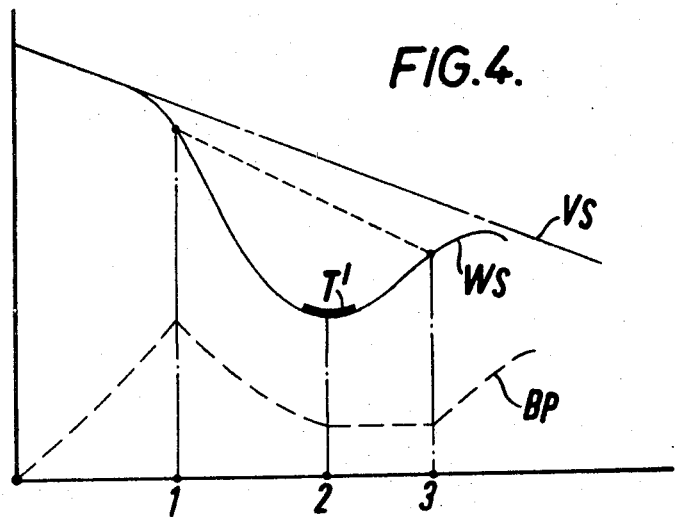
FIG. 4 is a graph showing wheel speed and brake pressure plotted against a base of time to illustrate the point at which wheel deceleration or acceleration is sensed for a further brake pressure modulation embodiment of the invention.

It will be seen from the above that for sensing at point 1 of the graph of FIG. 4, the antilock system senses e.g., 1.2 g. equivalent wheel deceleration and closes contacts S2 and S3 of FIG. 5 to energize coil $R_C$, $R_D$ respectively and actuate valves B and A. Contact S1 will be held closed whilst there is output from E1 for positive, negative or zero values of $V_C$. Actuation of valves B and A will effect release of the brakes.

The valves A and B operate in a similar manner to that described for FIG. 3a. In FIG. 5 both valves A and B are shown as plate valves, the movement of the plates opening and closing the ports.

At point 2 within the region T when contact S1 is released, i.e., when the voltage at point O/P of amplifier A3 is zero, the exhaust port $Z_5$ of plate valve B is blocked holding the brake pressure constant.

At point 3 of the graph, the antilock system signals the brake reapplication point, and with contact S1 open, contacts S2 and S3 also open thereby allowing reapplication of the brakes via valve A.

Figure 6:
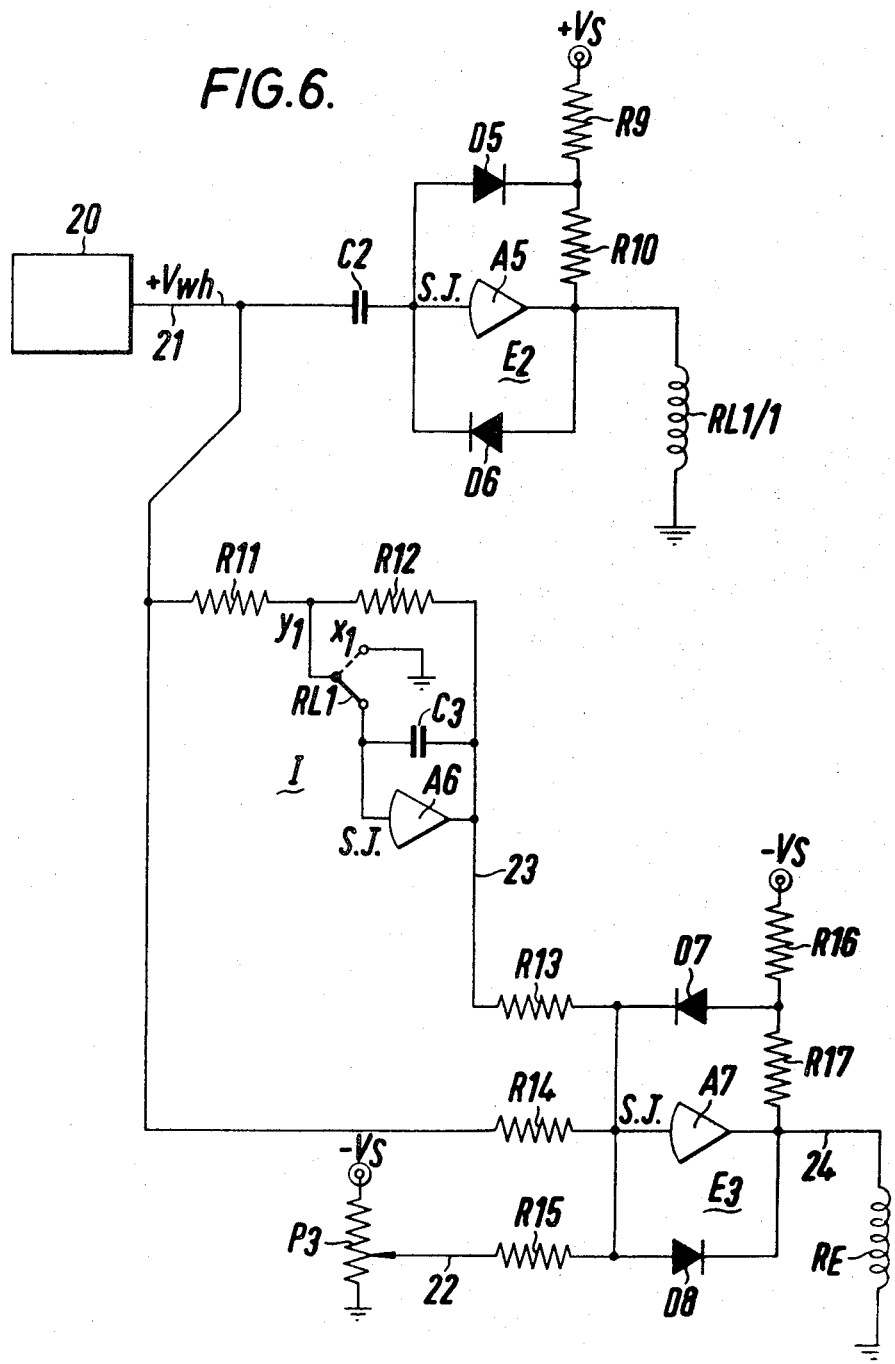
FIG. 6 is a circuit diagram, partly schematic for producing an output signal from a second of two comparator devices when wheel speed exceeds that at which wheel deceleration ceases by a predetermined amount

For the condition where arrest of brake pressure release is required when the wheel speed exceeds that at which deceleration ceases by, for example, 5 m.p.h., reference is directed to the circuit of FIG. 6 in which a tachogenerator 20 is responsive to wheel speed to produce a positive voltage signal $+V_{WH}$ on line 21 proportional to wheel speed. Signal $V_{WH}$ is applied via capacitor C2 to a comparator device $E_2$ and is also applied in parallel to resistor $R_{11}$ of a voltage divider $R_{11}$, $R_{12}$ of a mode-controlled integrator circuit, and to a resistor $R_{14}$ connected to the input point S.J. of a second comparator circuit $E_3$. Comparator $E_2$ includes operational amplifier A5 having diode D5 connected between input point S.J. and the junction of voltage divider R9, R10, and having oppositely poled diode D6 connected across the input and output terminals of the amplifier A5. A voltage signal $+V_S$ is applied to resistor $R_9$ and the output of the comparator $E_2$ is connected to relay coil RL1/1.

The mode-controlled integrator circuit I includes the voltage divider R11, R12, the junction of which is normally connected via contact RL1 of relay coil RL1/1 to the input point S.J. of operational amplifier A6, i.e., when relay coil RL1/1 is deenergized (wheel not accelerating). Capacitor $C_3$ is connected across the input and output terminals of the amplifier A6 and resistor R12 of the voltage divider R11, R12 acts as a feedback resistor and is connected to the output terminal of amplifier A6 and capacitor $C_3$. Upon energization of coil RL1/1, contact RL1 is switched to position $x_1$ which is earthed.

The second comparator circuit $E_3$ includes operational amplifier A7 with diode D7 connected to the output of the mode-controlled integrator circuit I via resistor R13 and also connected to the junction of voltage divider R16, R17 connected to negative voltage source $-V_S$. As previously indicated, the input point S.J. is connected to the output of the wheel speed sensor 20 via resistor R14 and an oppositely poled diode D8 is connected across the input and output terminals of amplifier A7. A negative reference voltage representing −5 m.p.h. is produced on line 22 connected to the slider of potentiometer P3 which is connected to negative voltage source $-V_S$. The reference voltage is applied via resistor R15 to the input of the amplifier A7 and the output of the amplifier is connected to the coil RE of a solenoid-operated antilock modulating valve which when energized is arranged to close a contact (not shown) equivalent to contact S1 of the antilock modulating solenoid of FIG. 5 to control the operation of valves A and B as previously described. As previously indicated, the purpose of the circuit of FIG. 6 is to arrest brake pressure release when the wheel speed exceeds that at which the deceleration ceased by a value equivalent to the reference signal $-V_S$ i.e., −5 m.p.h. Referring to FIG. 6, the comparator $E_2$ is arranged such as to produce an output signal from the output thereof to effect energization of relay coil RL1/1 only as long as the wheel is accelerating. The state of relay coil RL1/1 controls the mode of the mode-controlled integrator circuit I by operation of contact RL1. Contact RL1 is in the position shown when the wheel is not accelerating, i.e., relay coil RL1/1 is not energized. The output of the integrator on line 23 under these conditions will be $-V_{WH}$. This mode of the integrator will be termed the reset mode and in this mode the wheel sensor 20 supplies voltage $+V_{WH}$ to the input resistor $R_{11}$. The junction $y_1$ is at virtual earth potential and thus a current proportional to wheel speed is fed to the input of amplifier A6 to produce an inverted voltage $-V_{WH}$ at the output thereof. The effect of this negative voltage on comparator $E_3$ is as follows:

The three resistors $R_{13}$, $R_{14}$, $R_{15}$ thereof will have voltages applied thereto in the reset mode of integrator I corresponding to $-V_{WH}$, $+V_{WH}$ and $-V_S$ respectively. When the wheel is not accelerating the nett input voltage to comparator $E_3$ will be $-V_S$, i.e., equivalent to a wheel speed of 5 m.p.h. This −ve voltage will produce a limited output voltage sufficient to energize coil $R_E$ of the antilock modulating solenoid. The associated relay contact (S1 of FIG. 5) will be closed to give the necessary brake release in conjunction with antilock signal means as previously described.

When the wheel is accelerating out of a skid relay coil RL1/1 will be energized switching contact RL1 to the $x_1$ position. In this compute mode of the integrator I, as there is no input at input S.J. of amplifier A6 the output thereof remains substantially at the voltage corresponding to the value of $-V_{WH}$ obtaining when the wheel ceased decelerating. This voltage will be referred to as $(-V_{WH})_0$. As the wheel accelerates $-V_{WH}$ becomes $> (-V_{WH})_0$. Thus, the inputs to the resistors $R_{13}$, $R_{14}$, $R_{15}$ of comparator $E_3$ will be $(-V_{WH})_0$, $+V_{WH}$ and $-V_S$ respectively and when the difference between $(-V_{WH})_0$ and $V_{WH}$ represents more than 5 m.p.h. the output on line 24 will be zero and coil $R_E$ will be deenergized thereby effecting opening of contact S1 as previously described with reference to FIG. 5 and the graph of FIG. 4.

Figure 7A:
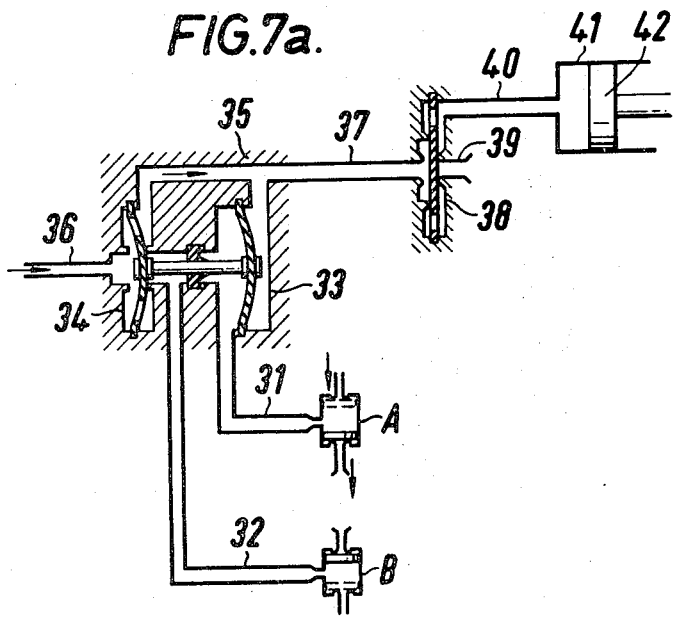
FIGS. 7a, 7b are diagrams of two brake control systems controllable in response to signals produced by the further brake pressure modulation embodiment of the invention.
Figure 7B:
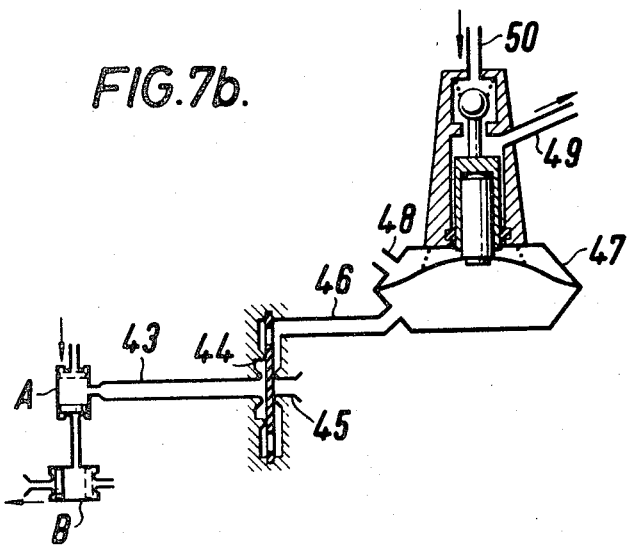

In FIGS. 7a and 7b there are shown two brake control systems for use with the antilock control circuits of FIGS. 5 and 6. In FIG. 7a an air brake system is shown in which the solenoid operated valves controlled by the circuits of FIGS. 5 and 6 are shown at A and B. The output pressure from each valve is applied via lines 31, 32 to respective chambers 33, 34, of a relay valve 35. Input line of chamber 34 is connected to a brake control valve and receives fluid pressure therefrom and the chambers 33, 34 are connected via output line 37 to the input of a quick release valve 38, the line 39 of which is exhausted to atmosphere and the output line 40 of which supplies air to the cylinder 41 of the air brake having piston 42 reciprocable therein. "The quick release valve 38 operates in the same manner as the valve $U_2$ of FIG. 3d."

In the air-hydraulic brake of FIG. 7b, the output line 43 from solenoid operated valve A is connected to the chamber 44 of a quick release valve of the type described with reference to FIG. 3d; the line 45 of which is connected to exhaust and the output line 46 of which is connected to the input chamber of an antilock servo 47. Line 48 thereof is connected to atmosphere and line 49 supplies fluid to the brakes; the line 50 receiving fluid from the master cylinder of the braking system.

I claim:

1. A vehicle brake control device comprising a solenoid operated brake control valve for controlling the degree of release of a vehicle's brakes to prevent locking of the brakes, a comparative circuit means with an output operatively connected to said control valve to actuate it in response to electrical signals received from said circuit means, axle load electrical signal means operatively connected to said circuit means to transmit an electrical signal to said circuit means responsive to the axle load of the vehicle, deceleration electrical signal means operatively connected to said circuit means to transmit an electrical signal to said circuit means responsive to the deceleration of the vehicle, and brake pressure electrical signal means operatively connected to said circuit means to transmit an electrical signal thereto responsive to the brake pressure of the vehicle.

* * * * *